United States Patent
Thorez et al.

(10) Patent No.: US 10,723,466 B2
(45) Date of Patent: Jul. 28, 2020

(54) DEVICE AND METHOD FOR DETERMINING THE WATER CONTENT IN THE ATMOSPHERE, DEVICE AND METHOD FOR DETECTING ICING CONDITIONS AND COMPUTER PROGRAMS

(71) Applicant: Zodiac Aerotechnics, Plaisir (FR)

(72) Inventors: Manuel Thorez, Les Molieres (FR); Laurent Paszkiewicz, Clamart (FR)

(73) Assignee: ZODIAC AEROTECHNICS, Plaisir (FR)

( * ) Notice: Subject to any disclaimer, the term of this patent is extended or adjusted under 35 U.S.C. 154(b) by 503 days.

(21) Appl. No.: 15/560,976

(22) PCT Filed: Mar. 23, 2016

(86) PCT No.: PCT/FR2016/050638
§ 371 (c)(1),
(2) Date: Sep. 22, 2017

(87) PCT Pub. No.: WO2016/151243
PCT Pub. Date: Sep. 29, 2016

(65) Prior Publication Data
US 2018/0257786 A1 Sep. 13, 2018

(30) Foreign Application Priority Data
Mar. 23, 2015 (FR) ...................................... 15 52402

(51) Int. Cl.
*B64D 15/20* (2006.01)
*G01N 15/02* (2006.01)
(Continued)

(52) U.S. Cl.
CPC ......... *B64D 15/20* (2013.01); *G01B 9/02043* (2013.01); *G01N 15/02* (2013.01);
(Continued)

(58) Field of Classification Search
CPC ................ B64D 15/20; G01B 9/02043; G01B 9/02041; G01N 15/0227; G01N 15/1434;
(Continued)

(56) References Cited

U.S. PATENT DOCUMENTS

2006/0232780 A1   10/2006  King
2008/0231854 A1*   9/2008  Seifert ............... G01N 15/0227
                                                            356/335

OTHER PUBLICATIONS

Yoshio Zama et al, "Simultaneous Measurement of Droplet Size and Three-Components of Velocity in Spray," Optical Review, Dec. 1, 2004, pp. 358-364, vol. 11, No. 6, Springer, Berlin, DE.
(Continued)

*Primary Examiner* — Jamil Ahmed
(74) *Attorney, Agent, or Firm* — Patzik, Frank & Samotny Ltd.

(57) ABSTRACT

A device for determining the water content in the atmosphere comprising: a laser transmitter suitable for transmitting a laser beam for illuminating particles of water and/or ice present in the atmosphere, a first out-of-focus imager having a first collection angle suitable for capturing at least one first representative image of the particles, and processing unit in communication connection with the first image. The device further comprises a second out-of-focus imager having a second collection angle suitable for capturing at least one second image. The processing unit is in communication connection with the second imager, the processing unit being suitable for processing the first and second images in order to determine the water content in the atmosphere.

15 Claims, 7 Drawing Sheets

(51) Int. Cl.
*G01N 15/14* (2006.01)
*G01B 9/02* (2006.01)

(52) U.S. Cl.
CPC ..... *G01N 15/0227* (2013.01); *G01N 15/1434* (2013.01); *G01B 9/02041* (2013.01); *G01N 2015/144* (2013.01); *G01N 2015/1445* (2013.01); *G01N 2015/1486* (2013.01); *G01N 2015/1493* (2013.01)

(58) Field of Classification Search
CPC ..... G01N 2015/144; G01N 2015/1445; G01N 2015/1486; G01N 2015/1493
See application file for complete search history.

(56) References Cited

OTHER PUBLICATIONS

Yoshio Zama et al, "Simultaneous measurement method of size and 3D velocity components of droplets in a spray field illuminated with a thin laser-light sheet," Measurement Science and Technology, Oct. 1, 2005, pp. 1977-1986, vol. 16, No. 10, IOP Publishing Ltd., Bristol, GB.

European Patent Office (EPO) International Search Report issued in corresponding PCT Application No. PCT/FR2016/050638, dated Jun. 27, 2016.

* cited by examiner

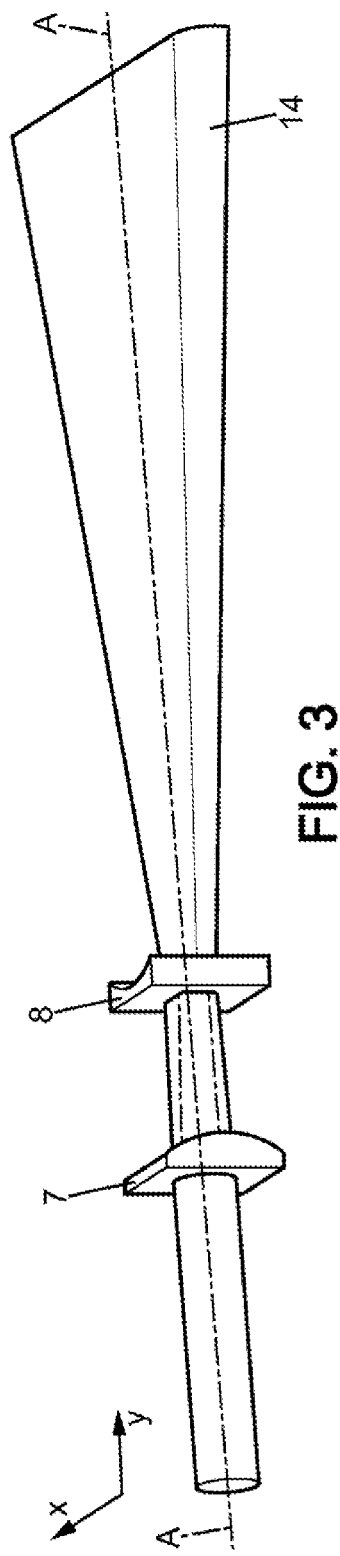
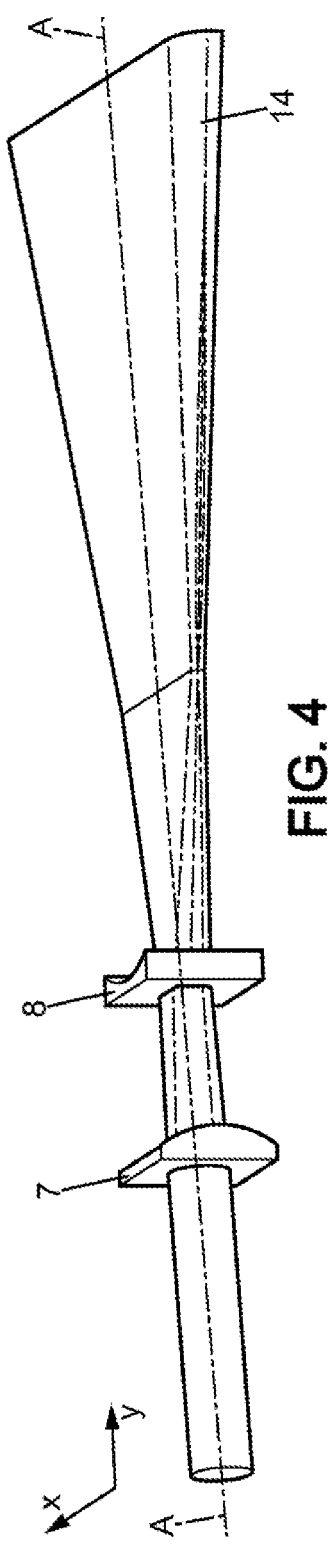

DEVICE AND METHOD FOR DETERMINING THE WATER CONTENT IN THE ATMOSPHERE, DEVICE AND METHOD FOR DETECTING ICING CONDITIONS AND COMPUTER PROGRAMS

FIELD OF THE INVENTION

The present invention is situated in the field of the detection of icing conditions in an aircraft in flight.

In particular, the present invention relates to a device and method for determining the water content in the atmosphere and a device and method for detecting icing atmospheric conditions. The invention also relates to a computer program.

BACKGROUND OF THE INVENTION

Since the beginning of the 1990s, incidents with engines and anomalies in aerodynamic speed and temperature measurements in airliners have been observed at high altitude and low temperature. In 2004, a working group on the harmonisation of engines known as EHWG (Engine Harmonisation Working Group) established that the icing conditions due to the presence of supercooled large droplets (SLDs), to the presence of ice crystals or to the simultaneous presence of SLDs and ice crystals gave rise to these anomalies. The American Federal Aviation Administration (FAA) and the European Aviation Safety Agency (EASA) introduced, in November 2014, changes to the regulations in force for overcoming the threat represented by such icy conditions for the safety of aircraft in flight. These new regulations are described in the document entitled "Aircraft and Engine Certification Requirements for Supercooled Large Drop, Mixed Phase and Ice Crystal Icing Conditions, Federal Aviation Administration Docket No. FAA-2010-0636, Amendment Nos. 25-140 and 33-34, Nov. 4, 2004".

The regulation CS25 and in particular Appendix O thereof ("14 CFR part 25, Appendix O") stipulates that water droplets with a diameter between 5 micrometres and 2300 micrometres must be able to be detected. The regulation CS33 and in particular Appendix D thereof ("14 CFR part 33, Appendix D") stipulates that ice crystals with a size of between 5 micrometres and 2700 micrometres must be able to be detected.

The interferometric laser imagining technique for determining the size of droplets, generally referred to as the ILIDS technique ("Interferometric Laser Imaging for Droplet Sizing"), developed about 30 years ago, makes it possible to measure the size of spherical droplets in one plane (analysis in two dimensions). According to this technique, the water droplets are illuminated by a laser sheet polarised at a specific observation angle. Two light points, referred to as glare points, are visible on the surface of the droplets. These glare points create an interference pattern having the form of parallel fringes when they are imaged in a plane outside the focal plane of an optical system. The interfringe, that is to say the distance between two successive fringes, is inversely proportional to the distance between these two glare points. Thus an interfringe measurement makes it possible to determine the diameter of the droplets.

This technique has also been used to determine a size of a solid particle as described in the documents "Z. ULANOWSKI et al, Retrieving the size of particles with rough and complex surfaces from two-dimensional scattering patterns. *Journal of Quantitative Spectroscopy and Radiative Transfer.* 2012" and "D CHICEA. Biospeckle size and contrast measurement application in particle sizing and concentration assessment. *Biophysics*, Sep. 12, 2006". According to these documents, when a solid ice crystal or any shape and with a rough surface is illuminated by a laser sheet, a multitude of glare points are visible on the surface of the crystal. The image outside the focal plane shows a speckle image. The size of the speckle grain is inversely proportional to the largest size of the visible ice crystal.

However, ILIDS out-of-focus interferometric imaging makes it possible to measure water droplets or ice crystals the sizes of which vary in a ratio of approximately a decade only, in particular because of the large size of water droplets and/or ice crystals and the limited performance of imagers existing on the market.

However, the size of the water drops and ice crystals present in the atmosphere varies between 5 µm and 2700 µm. This range of sizes is much greater than the range of sizes that can be determined by conventional interferometric imaging.

SUMMARY OF THE INVENTION

The aim of the invention is to propose a device for determining the water content in the atmosphere that meets the requirements of in-flight safety established by the FAR regulations and meets the requirements in respect of reliability and robustness in aeronautics and in particular resistance to high vibrations, a service life greater than 30 years and the possibility of functioning in a temperature range from −50° C. to +70° C.

To this end, the subject matter of the invention is a device for determining the water content in the atmosphere, comprising:

a laser emitter able to emit a laser beam intended to illuminate particles present in the atmosphere, said particles being water particles and/or ice particles, a first out-of-focus imager, the first imager having a first collection angle, the first imager being able to capture at least one first image representing particles in a first range of sizes, and a processing unit in communication connection with the first imager.

It also comprises a second out-of-focus imager, the second imager having a second collection angle, the second imager being able to capture at least one second image representing particles in a second range of sizes, the processing unit is in communication connection with the second imager, the processing unit being able to process the first and second images in order to determine the water content in the atmosphere.

Advantageously according to the invention, the use of two or more imagers makes it possible to measure a population of particles having a range of sizes greater than the range of sizes covered by ILIDS technology and thus makes it possible to overcome the drawback of the prior art.

Advantageously, this determination device is reliable and robust.

According to particular embodiments, the determination device comprises one or more of the following features:

The laser beam has a uniform rectangular intensity profile.

Advantageously, this type of beam makes it possible to illuminate the whole of the sampling volume homogeneously.

The laser beam has a sheet form that lies in an emission plane, and in which said laser beam diverges in a direction perpendicular to the emission plane.

Advantageously, this divergent form makes it possible to obtain different sampling volume thicknesses.

The laser beam has a sheet form that lies in an emission plane, and in which said laser beam converges in a direction perpendicular to the emission plane in a zone close to the laser emitter, and diverges in a direction perpendicular to the emission plane in a zone distant from the laser emitter.

Advantageously, this convergent and then divergent form makes it possible to more finely adapt the thicknesses of the sampling volumes.

The first imager has a field angle of between 2° and 10° and the second imager has a field angle of between 10° and 25°.

Advantageously, the first imager makes it possible to take into account a high concentration of small particles. While the second imager makes it possible to take into account a small concentration of coarse particles.

The laser beam has an emission axis, the first imager comprising a pupil and a diffusion axis, the second imager comprising a pupil and a diffusion axis and wherein the length of the diffusion axis of the first imager defined between the pupil of the first imager and the emission axis is between 50 millimetres and 200 millimetres, and the length of the diffusion axis of the second imager defined between the pupil of the second imager and the emission axis is between 100 millimetres and 300 millimetres.

The device further comprises a third out-of-focus imager having a third collection angle able to capture at least one third image representing particles lying in a third range of sizes, and in that the processing unit is in communication connection with the third imager, the processing unit being able to process the images captured by the first, second and third images in order to determine the water content present in the atmosphere.

Advantageously, the use of three imagers makes it possible to determine the water content in the atmosphere over the whole of the range of sizes of liquid and solid particles specified by the aeronautical regulations.

The laser beam has a sheet form that lies in an emission plane, and in which the mean dimension of the laser beam in a direction perpendicular to the emission plane is defined in accordance with the following equation $t(di)=2\times\ln((di+150)/150)$ in which:

t is the dimension of the laser beam measured in a direction perpendicular to the emission plane, and di is the size of the particles measured in the plane perpendicular to the diffusion axis.

The present invention also relates to a device for detecting icing atmospheric conditions. This detection device comprises a device for determining the water content defined as mentioned above; an input able to receive a temperature value of the outside air; and in which the processing unit is able to detect icing atmospheric conditions according to the water content determined and the value of the temperature of the outside air.

The present invention also relates to a method for determining the water content in the atmosphere by the processing of images acquired by a determination device comprising a laser emitter able to emit a laser beam intended to illuminate water and ice particles present in the atmosphere, a first and second imager able to capture at least one first image and respectively a second image representing particles, and a processing unit in communication connection with the first and second imager, the method comprising the following steps:

a) Determining the sizes of the particles imaged on said first image and said second image;

b) Calculating the mass of the particles per unit volume of the imaged particles on said first image and said second image; and c) Determining the water content in the atmosphere by adding the mass calculated for the first image and the mass calculated for the second image.

The present invention also relates to a method for detecting icing atmospheric conditions. This method comprises the following steps:

determining the water content by implementing the determination method described above;

receiving an outside temperature value;

detecting icing atmospheric conditions from the water content and the outside temperature value.

Finally, the invention relates to a computer program containing instructions for implementing the determination method described above when it is executed by a processor, and a computer program containing instructions for implementing the detection method described above when it is executed by a processor.

BRIEF DESCRIPTION OF THE DRAWINGS

The invention will be understood better from a reading of the following description given solely way of example and made with reference to the figures, in which:

FIG. 3 is a schematic perspective view of the laser emitter and of the laser beam of the determination device illustrated in FIG. 1;

FIG. 4 is a schematic perspective view of a laser emitter and of a laser beam according to a variant embodiment of the determination device according to the invention;

DETAILED DESCRIPTION OF THE INVENTION

In the present patent application, the term "particle" has been used to designate both water droplets and ice crystals. The term "size di" has been used to define the size of a particle in the plane perpendicular to the diffusion axis as defined below.

Figure 1:
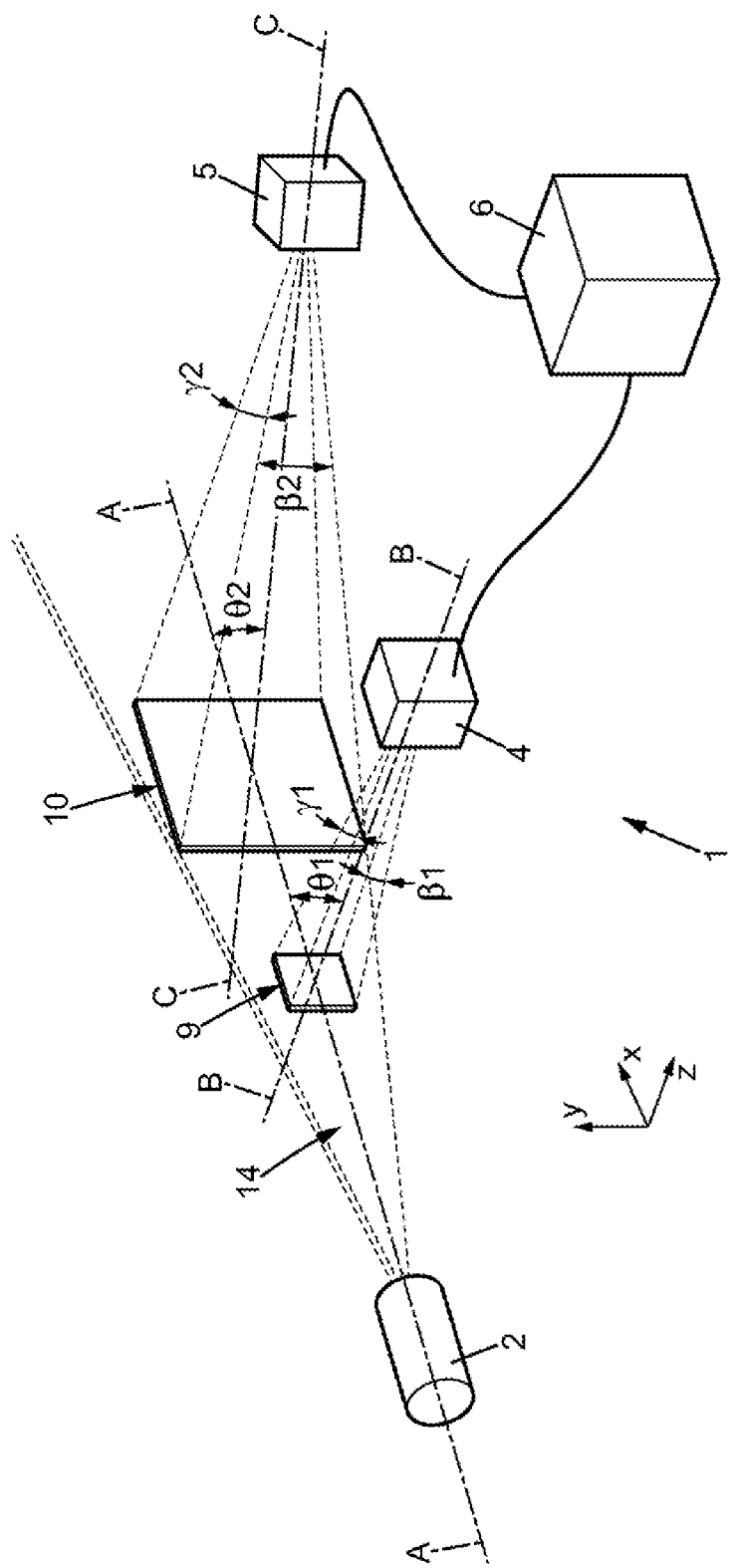
FIG. 1, which is a schematic view of the device for determining water content according to the present invention.

The device 1 for determining water content in the atmosphere according to the invention is shown in FIG. 1. The water content is the quantity of water contained in a volume of air. This determination device 1 makes it possible to acquire images by out-of-focus interferometric imaging (ILIDS). This determination device 1 is installed in an aircraft in flight.

With reference to FIG. 1, this determination device 1 comprises a laser emitter 2 able to emit a pulsed laser beam 14, a first out-of-focus imager 4 able to capture images of particles 11, 12 having a size lying in a first range of sizes;

a second out-of-focus imager 5 able to capture images of particles 11, 12 having a size lying in a second range of sizes; and a processing unit 6 in communication connection with the first 4 and second 5 imagers, for example in cabled communication connection.

The laser emitter 2 and the first 4 and second 5 imagers are for example placed inside the fuselage of an aircraft and point towards the outside through a window.

The laser emitter 2 comprises a unit, not shown, able to emit a laser beam having an emission axis A-A and an optical device 7, 8 able to focus the laser beam emitted into a sheet. This sheet lies in a plane, referred to as the emission plane (x, y), considering the direct orthogonal reference frame (x, y, z) shown in FIG. 1.

Preferably, the laser beam 14 has a form which diverges in a direction perpendicular to the emission plane (x, y) from a part of the space in the vicinity of the laser beam to a part of the space further away from the laser emitter 2, as shown in FIG. 3.

As can be seen in FIG. 3, this form is for example obtained by an optical system comprising two cylindrical lenses 7, 8.

The determination of the number of particles 11, 12 having a size lying in the first range of sizes is carried out in a first sampling volume 9 defined by the intersection of the laser beam 14 and the field of vision of the first imager 4. In the same way, the determination of the number of particles 11, 12 having a size lying in the second range of sizes is carried out in a sampling volume 10 defined by the intersection of the laser beam 14 and the field of vision of the second imager 5.

The height and width of the first sampling volume 9 are determined by the field angles γ1 and β1 of the first imager 4 and by the distance between the first imager 4 and the first sampling volume 9. The field angles γ1 and β1 of the first imager 4 are for example between 2° and 10°.

In the same way, the height and the width of the second sampling volume 10 are given by the field angles γ2 and β2 of the second imager 5 and by the distance between the second imager 5 and the second sampling volume 10.

The field angles γ2 and β2 of the second imager are for example between 10° and 25°.

Advantageously, the divergent form of the laser beam 14 makes it possible to adapt the thickness (the dimension along the z axis) of the first sampling volume 9 and the thickness of the second sampling volume 10 according to the size and concentration of the particles that it is wished to measure. In general terms, the first sampling volume 9, which is positioned close to the laser emitter 2, is used to measure small particles. The second sampling volume 10, which is positioned at a further distance from the laser emitter 2, is used to measure larger particles.

For example, a first sampling volume 9 having a thickness of between 0.25 and 1.4 millimetres makes it possible to sample particles having a size di of between 15 and 150 micrometres.

For example, a second sampling volume 10 having a thickness of between 2 and 5 millimetres makes it possible to sample particles having a size di of between 150 and 1500 micrometres.

Advantageously, the thickness of the sampling volumes 9, 10 must be greater than the maximum size of the particles that it is wished to measure. The thickness must however not be too great in order to reduce the probability of superimposition of the particles in the field of view. Experiments have led to establishing an empirical law defining the mean thickness of the sampling volume in a direction (z) perpendicular to the emission plane (x, y). This mean thickness is also the mean dimension of the laser beam 14 in a direction (z). It is defined by the following equation:

$$t(di)=2\times \ln((di+150)/150)$$

in which:

t is the dimension of the laser beam (14) measured in a direction (z) perpendicular to the emission plane (x, y), and di is the size in micrometres of the particles measured in the plane perpendicular to the diffusion axis.

For example, the laser beam 14 should have a thickness t of approximately 1 millimetre in order to measure particles having sizes lying in a first range of sizes from 10 micrometres to 100 micrometres. The laser beam 14 should have a thickness t of approximately 4 millimetres in order to measure particles having sizes lying in a second range of sizes from 100 micrometres to 1000 micrometres.

Figure 2:
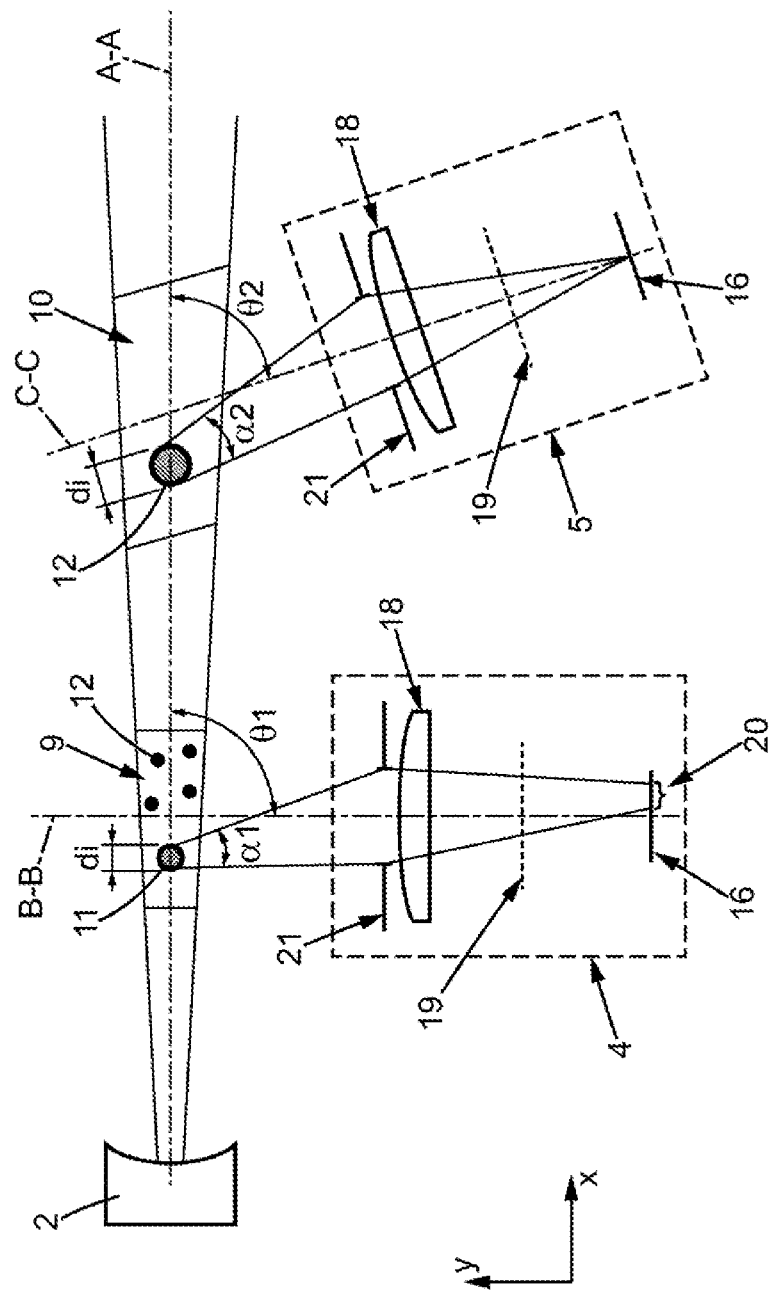
FIG. 2 is a schematic plan view of the determination device illustrated in FIG. 1.

In the embodiment shown in FIGS. 1 and 2, the first sampling volume 9 and the second sampling volume 10 are separate from each other for reasons related to the size of the device. The determination of the water content nevertheless remains exact since these sampling volumes statistically have the same particles pass through them per given unit volume.

The laser emitter 2 is able to generate a laser beam 14 having a uniform rectangular intensity profile generally referred to in English as "top hat". The laser beam 14 is polarised. In the case where the electrical field of the laser beam 14 changes in a plane (x, z), the polarisation is said to be parallel. The plane (x, z) contains the diffusion axis B-B of the first imager 4 and the diffusion axis C-C of the second imager 5. The polarisation is said to be perpendicular in the case where the electrical field changes in the emission plane (x, y). The polarisation is chosen according to the diffusion angles. For example, in the embodiment described, the diffusion angles θ1 and θ2 are 90° and 120° respectively and the polarisation is parallel.

The wavelength of the laser is for example 532 nm. The pulse frequency of the laser is synchronised to the frequency of acquisition of the images by the first 4 and second 5 imagers.

The first 4 and second 5 imagers consist for example of CCD cameras.

The first imager 4 has an optical axis B-B that forms an angle $\theta_1$ with the emission plane (x, y) of the laser sheet. The second imager 5 has an optical axis C-C that forms an angle $\theta_2$ with the emission plane (x, y) of the laser sheet. These angles $\theta_1$ and $\theta_2$ are generally referred to as diffusion angles.

The diffusion angles $\theta_1$ and $\theta_2$ are fixed. They are predetermined so as to obtain, for each water particle, glare points having equivalent intensities. The diffusion angles $\theta_1$ and $\theta_2$ are also dependent on the wavelength and polarisation of the laser.

In the example embodiment shown in FIG. 1, the wavelength of the laser is 532 nanometres and the diffusion angles $\theta_1$ and $\theta_2$ are different from each other. The diffusion angle θ1 is for example 90° and the diffusion angle θ2 is for example 120°. The diffusion angle θ1 of 90° makes it possible to measure particles that are in the first sampling volume 9 and have a size lying in the first range of sizes. The diffusion angle θ2 of 120° makes it possible to measure particles that are in the second sampling volume 10 and have a size lying in the second range of sizes.

With reference to FIG. 2, the first 4 and second 5 imagers each comprise a convergent optical system 18 of focal length F, a pupil 21 and an image acquisition plane 19 situated upstream of the focal plane 16 of the convergent optical system 18.

The distance between the image acquisition plane 19 and the focal plane 16 is referred to as "defocusing".

The first imager 4 is able to capture images formed by the diffusion of the laser beam 14 on the particles situated in the first sampling volume 9. The second imager 5 is able to capture images formed by the diffusion of the laser beam 14 on the particles situated in the second sampling volume 10. The particles imaged by the first 4 and second 5 imagers are the water particles and the ice particles contained in the first and respectively second sampling volume.

Each particle illuminated by the laser beam re-emits a portion of this beam in the whole of the space. While the diffusion diagram of a circular particle is predictable and described by Mie theory, the diffusion by a solid particle consisting of a multitude of facets is no longer deterministic. The out-of-focus imager makes it possible to recover part of the laser beam diffused by the particle (angular diffusion function) in order to analyse it.

The pupil 21 of the optical system of the first imager and the length of the diffusion axis B-B of the first imager 4 defined between the pupil 21 of the first imager and the emission axis A-A define a cone. The angle at the vertex of this cone is referred to as the collection angle $\alpha 1$. This collection angle is equal to:

$$\alpha 1 = a\tan(\Phi 1/D1)$$

in which
a tan is the arctangent mathematical function,
$\Phi 1$ is the diameter of the pupil 21 of the first imager 4, and
D1 is the length of the diffusion axis B-B lying between the pupil 21 of the first imager and the emission axis A-A.

In the same way, the collection angle $\alpha 2$ is defined by the equation $$\alpha 2 = a\tan(\Phi 2/D2)$$

in which:
a tan is the arctangent mathematical function,
$\Phi 2$ is the diameter of the pupil 21 of the second imager 5, and
D2 is the length of the diffusion axis C-C lying between the pupil 21 of the second imager 5 and the emission axis A-A.

These collection angles $\alpha 1$ and $\alpha 2$ are illustrated in FIG. 2.

The field angles $\gamma 1$, $\gamma 2$, $\beta 1$ and $\beta 2$, the defocusing, the focal distance F of the convergent optical system, the collection angles $\alpha 1$ and $\alpha 2$, the distance between the laser beam and each of the imagers, and the spatial resolution of the first 4 and second 5 imagers are adapted to the sizes and concentrations of the particles that it is wished to measure. They are hereinafter referred to as acquisition parameters. The acquisition parameters of the first 4 and second 5 imagers are therefore different from each other. In the sensitive regions of each imager, the dimension of the interferograms 22 representing the water particles and ice particles is invariant whatever the size of these water particles 11 and of these ice particles 12. This dimension of the interferograms is fixed by the acquisition parameters.

For example, in the embodiment depicted (532 nm laser, parallel rectilinear polarisation beam, diffusion angle of the first imager: $\theta 1=90°$, diffusion angle of the second imager: $\theta 2=120$), the following acquisition parameters may be used:

collection angles of the first imager: $\alpha 1=4.58°$,
collection angles of the second imager: $\alpha 2=2.18°$,
thickness of the sheet at the centre of the first sampling volume: 500 µm,
thickness t of the beam at the centre of the second sampling volume equal to 3 mm,
field angle $\gamma 1$ and field angle $\beta 1$ of the first imager equal to 7.5°,
length D1 of the diffusion axis B-B lying between the pupil 21 of the first imager and the emission axis A-A is equal to 152 mm,
field angle $\gamma 2$ and field angle $\beta 2$ of the second imager equal to 17.2°,
length D2 of the diffusion axis C-C lying between the pupil 21 of the first imager and the emission axis A-A is equal to 194 mm.

The processing unit 6 comprises a calculation unit and a memory able to store instructions for implementing a method for determining water content according to the invention.

The processing unit 6 is able to receive at least one first image 36 acquired by the first imager 4 and at least one second image acquired by the second imager 5 and to process a first image and a second image using the determination method described below.

The processing unit 6 is able to generate information relating to the water content in the atmosphere using the processing of the first image issuing from the first imager 4 and the processing of the second image issuing from the second imager 5.

In a variant, the diffusion angles $\theta 1$ and $\theta 2$ may be identical and equal to 90° with a laser emitter 2 emitting a beam having a wavelength equal to 532 nanometres.

According to another variant, the laser emitter 2 emits a beam having a wavelength of 1550 nanometres, the diffusion angle $\theta 1$ is equal to 90° and the diffusion angle $\theta 2$ is equal to 130°.

In a variant, the first sampling volume 9 could be included in the second sampling volume. A suitable optical system would then make it possible to capture the images taken by each of the imagers.

According to a variant shown in FIG. 4, the laser sheet 14 converges in a direction perpendicular to the emission plane (x, y) in a part of the space in the vicinity of the laser emitter 2, and then diverges in a part of the space further from the laser emitter 2. Advantageously, the convergent and then divergent form of the laser makes it possible to adapt the thickness (the dimension along the axis z) of the first sampling volume 9 and the thickness of the second sampling volume 10 according to the size and concentration of the particles that it is wished to measure.

In a variant, the determination device according to the invention comprises a first laser emitter able to generate a laser sheet having a first thickness (the dimension along the axis z) and a second laser emitter able to generate a laser sheet having a second thickness; the second thickness having a greater dimension than the first thickness.

According to a variant, not shown, the determination device according to a second embodiment comprises a first, second and third imager. These three imagers make it possible to determine the size of all the atmospheric particles.

For example, in this embodiment, the acquisition parameters of the first imager are defined so as to determine the size of the particles having a size of between 5 µm and 50 µm. In this case, the thickness of the first sampling body would be 0.6 millimetres. The acquisition parameters of the second imager are defined so as to determine the size of the particles having a size of between 50 μm and 500 μm. In this case, the thickness of the second sampling volume would be 3 millimetres. The acquisition parameters of the third imager are defined so as to determine the size of the particles having a size of between 500 μm and 5000 μm. In this case, the thickness of the third sampling volume would be 7 millimetres.

Figure 5:
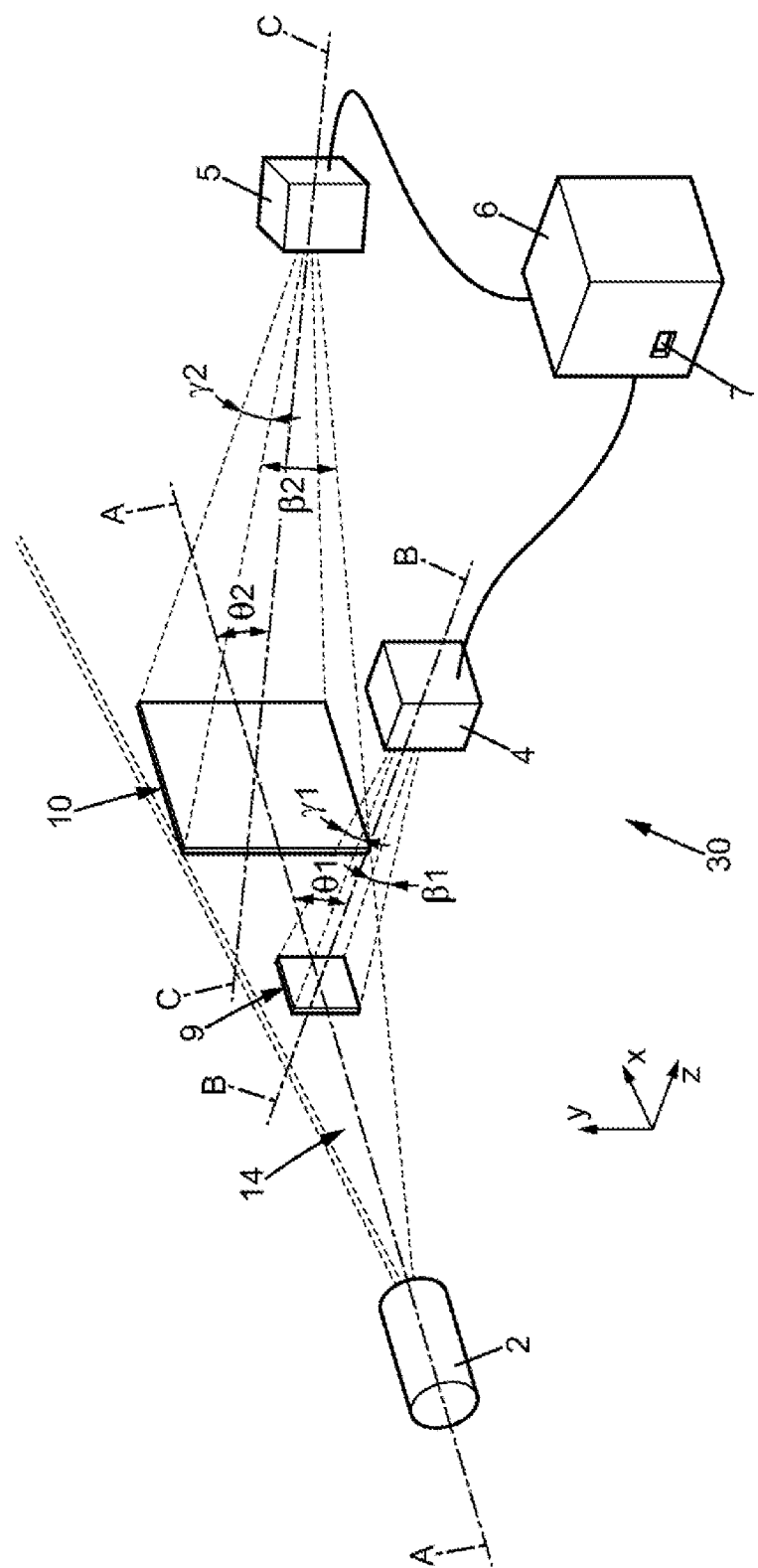
FIG. 5 is a perspective view of the device for detecting icing atmospheric conditions according to the present invention.
Figure 6:
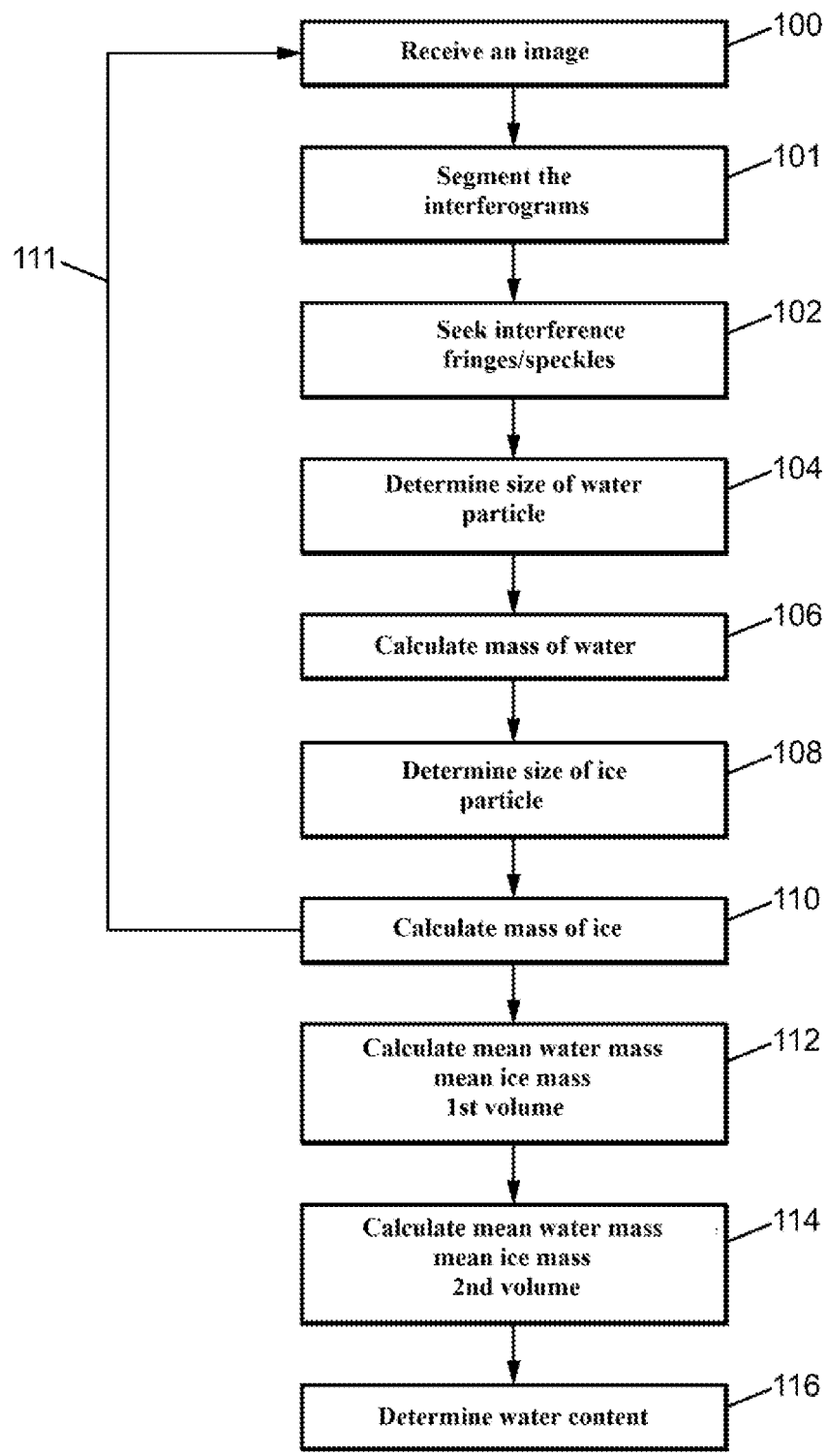
FIG. 6 is a diagram representing steps of the determination method according to the invention.

The present invention also relates to a device 30 for detecting icing atmospheric conditions shown in FIG. 5.

This detection device 30 comprises the same technical elements as the determination device 1 described above in relation to FIGS. 1 to 4. These technical elements are referenced by the same references and will not be described again. The detection device 30 is therefore similar to the determination device 1 with the exception of the fact that the processing unit 6 of the detection unit 30 further comprises an input 7 able to receive a temperature value for the outside air (OAT: outside air temperature). This outside temperature value is for example supplied by an outside temperature measurement device already existing in the aircraft. The processing unit 6 of the detection device is able to detect icing atmospheric conditions according to the water content determined and the temperature of the outside air received as described in the detection method described below.

When the aircraft is flying in a cloud, the particles 11, 12 contained in the cloud pass through the first 9 and second 10 sampling volumes at the speed of the aircraft. These particles may consist of water particles 11, that is to say water droplets, or ice particles 12, that is to say ice crystals.

The imager 4 captures a first image 36 of the particles 11, 12 contained in the first sampling volume 9, for example every ½₀ of a second. Simultaneously (or in parallel), the imager 5 captures a second image of the particles contained in the second sampling volume 10.

The determination method according to the present invention is then executed by the processing unit 6 on a plurality of first images generated by the first imager 4, and on a plurality of second images generated by the second imager 5.

The greater the number of images on which the determination method is executed, the more the result will be representative of the global nature of the cloud and the longer the response time of the determination device. The compromise between the precision of the result and the response time can be negotiated by the user of the determination device.

The processing steps described below are implemented on each first image captured by the first imager, taking into account the dimensions of the first sampling volume 9 for the calculation steps 106, 110 and 112.

Figure 7:
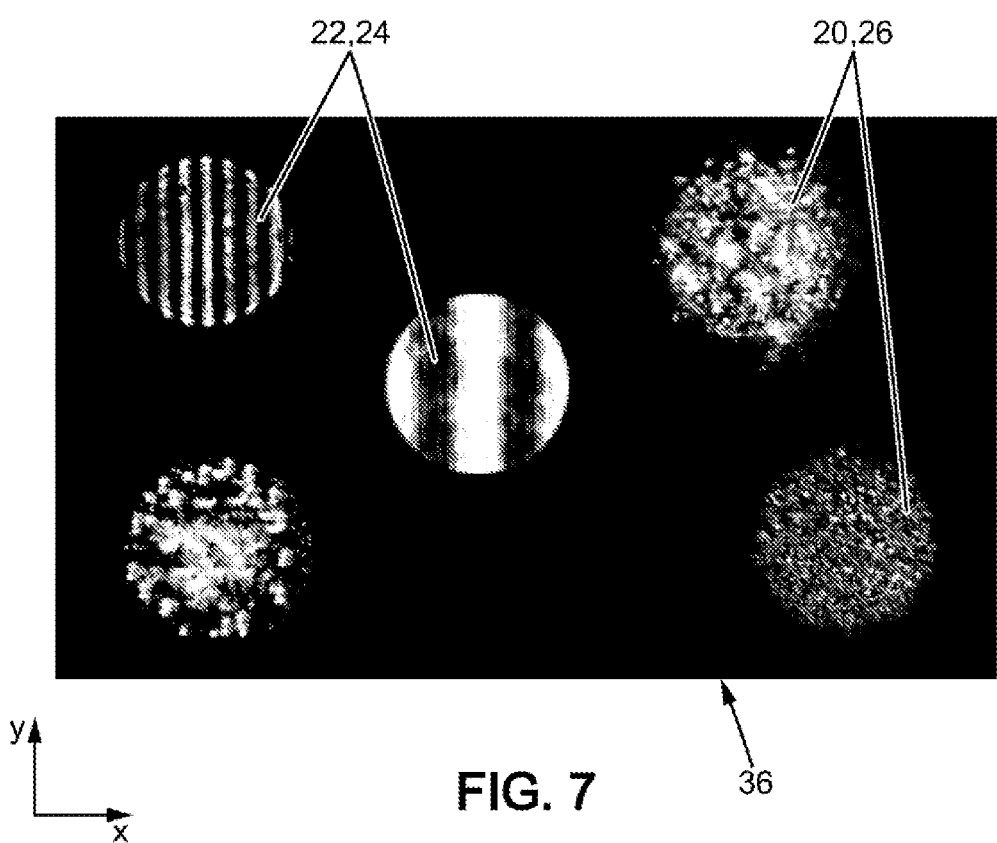
FIG. 7 is a schematic representation of an example of an image acquired by the first or second imager of the determination device according to the present invention.

During a first step 100, a first image 36 is received by the processing unit 6. An example of a first image is shown in FIG. 7. This first image 36 contains a number of interferograms 22 equal to the number of particles 11, 12 that there are in the first sampling volume at the time when the image is taken. The interferograms 22 are all in the form of discs with the same diameter dependent on the acquisition parameters, whatever the size of the particles. The discs containing parallel interference fringes 24 correspond to water particles 11. The discs containing speckles 26 represent ice particles 12.

During a segmentation step 101, the interferograms are separated from the background of the image.

To this end, adaptive thresholding is carried out on the whole of the image 36 according to the mean level of grey of the image, followed by a median filtering. A morphological opening (erosion followed by dilation) is next carried out in order to eliminate the objects that are too small to belong to an interferogram of known fixed dimension. A series of successive dilations are carried out in order to collect the remaining elements so as to form the markers of the interferograms that are sought. The centres of these markers are next sought. The original image is next masked with discs the centres of which are those of the markers. These discs have a diameter identical to that of the interferograms. This diameter is calculated from the acquisition parameters.

During a step 102, the interferograms 22 representing the water particles 11 and interferograms 22 representing ice particles 12 are sought. For each interferogram segmented at step 101, the autocorrelation function along the axis y is calculated. When the width half way up the autocorrelation peak obtained is below a defined threshold, then this interferogram represents a water particle 11, otherwise this interferogram represents an ice particle 12. The threshold is defined according to the acquisition parameters.

For each interferogram 22 representing a water particle, the size di of this particle is calculated during a step 104. To this end, the Fourier transform of the interferogram is calculated, and the interfringe is deduced therefrom. Then the size di of the water particle 11 is calculated from this interfringe using the conventional ILIDS equation described in the document "G. Koenig, K Anders and A. Frohn. *A new light-scattering technique to measure the diameter of periodically generated moving droplets. Journal of Aerosol Sciences,* 17:157-167, 1986".

During a step 106, the mass of water in the sampling volume is calculated. For this purpose, the volume of each water particle identified in the image is calculated from the formula $\pi di^3/6$ where di is the size calculated during step 104. Then the volumes calculated for each water particle are added in order to determine the volume of all the water particles contained in the sampling volume. The mass of water corresponding to this volume is calculated by multiplying the density of water by the volume of all the water particles. Finally, this mass of water is divided by the sampling volume defined in cubic metres.

For each interferogram 22 of ice particles 12 identified at step 102, the size di of this ice particle is measured during a step 108, carrying out a two-dimensional autocorrelation function of the speckle pattern 26. This autocorrelation function makes it possible to obtain a distribution in the form of a peak. Then the width half-way up the peak is measured. The size di of the ice particle 12 on a plane parallel to the image acquisition plane 19 is evaluated from this width half-way up, as described in the scientific publications such as "D. Chicea. Biospeckle size and contrast measurement application in particle sizing and concentration assessment. *Biophysics*, Sep. 12, 2006".

During a step 110, the mass of ice in the sampling volume is calculated. For this purpose, the volume of each ice particle identified in the image is calculated from mass-diameter laws considering the size di calculated during step 104, such as the one proposed by Heymsfield in "Andrew J. Heymsfield. Refinements to Ice Particle Mass Dimensional and Terminal Velocity Relationships for Ice Clouds. Part II: Evaluation and Parameterisations of Ensemble Ice Particle Sedimentation Velocities. *Journal of the Atmospheric Sciences* 2006. Then the masses calculated for each ice particle are added in order to determine the mass of all the ice particles contained in the sampling volume. Finally, this mass of ice is divided by the sampling volume defined in cubic metres.

During a step 111, the method returns to step 100 during which the processing unit receives a new first image 36.

Steps 100 to 110 are repeated on a plurality of first images coming from the first imager 4.

Then, during a step 112, the mean mass of water in the first sampling volume and the mean mass of ice in the first sampling volume 9 are calculated from the ice masses and water masses calculated on a plurality of first images.

At the same time, during a step 114, the mean mass of water and the mean mass of ice in the second sampling volume 10 are calculated. To this end, the processing steps 100 to 112 are implemented on a plurality of second images captured by the second imager 5 taking into account the dimensions of the second sampling volume 10 for the calculation steps 106, 110 and 112. The second image is similar to the first image. It has therefore not been shown in the figures.

Finally, during step 116, the water content in the atmosphere is determined by adding the mean mass of water and the mean mass of ice calculated during steps 112 and 114. This water content comprises the liquid water content LWC and the solid water content IWC (ice water content) issuing from the first 9 and second 10 sampling volumes.

In a variant, the steps of the determination method are performed using a single first image and a single second image.

The present invention also relates to a method for detecting icing atmospheric conditions. This method is implemented by the detection device 30 illustrated in FIG. 5.

Figure 8:
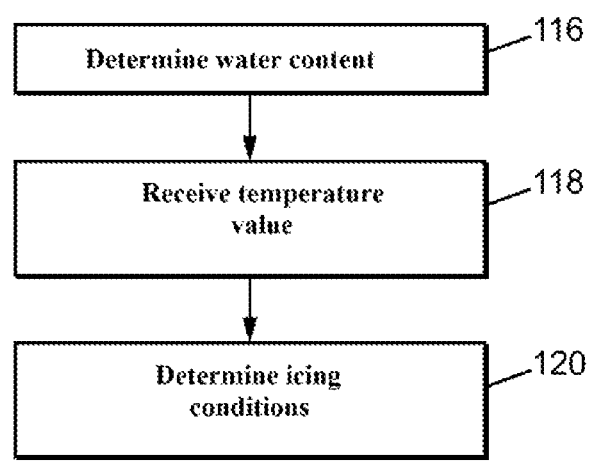
FIG. 8 is a diagram representing the steps of the detection method according to the invention.

This detection method is illustrated in FIG. 8. It comprises the same steps 100 to 116 as the determination method described above. It further comprises the additional steps 118 and 120 described below.

During step 118, a temperature of the outside air is received by the input 7 of the processing unit 6.

During step 120, the icing conditions are detected from the water content obtained during step 116 and the temperature received by the input 7, applying the regulations in force, in particular the previously mentioned CFR standards.

The invention claimed is:

1. A device for determining the water content in the atmosphere, comprising:
a laser emitter able to emit a laser beam intended to illuminate particles present in the atmosphere, said particles being water particles and/or ice particles,
a first out-of-focus imager having a first collection angle and able to capture at least one first image representing particles in a first range of sizes, and
a processing unit in communication connection with the first imager, and
a second out-of-focus imager having a second collection angle and able to capture at least one second image representing particles in a second range of sizes;
wherein the processing unit is in communication connection with the second imager, the processing unit being able to process the first and second images in order to determine the water content in the atmosphere, the processing unit being configured to calculate the mass of the particles per unit volume of the imaged particles on said first image and said second image and to determine the water content in the atmosphere by adding the mass calculated for the first image and the mass calculated for the second image.

2. The device according to claim 1, in which the laser beam has a uniform rectangular intensity profile.

3. The device according to claim 1, in which the laser beam has a sheet form that lies in an emission plane, and in which said laser beam diverges in a direction perpendicular to the emission plane.

4. The device according to claim 1, in which the laser beam has a sheet form that lies in an emission plane, and in which said laser beam converges in a direction perpendicular to the emission plane in a zone close to the laser emitter, and diverges in a direction perpendicular to the emission plane in a zone distant from the laser emitter.

5. The device according to claim 1, in which the first imager has a field angle of between 2° and 10° and the second imager has field angle of between 10° and 25°.

6. The device according to claim 1, in which the laser beam has an emission axis, the first imager comprising a pupil and a diffusion axis, the second imager comprising a pupil and a diffusion axis and wherein the length of the diffusion axis of the first imager defined between the pupil of the first imager and the emission axis is between 50 millimetres and 200 millimetres, and the length of the diffusion axis of the second imager defined between the pupil of the second imager and the emission axis is between 100 millimetres and 300 millimetres.

7. The device according to claim 1, which further comprises a third out-of-focus imager having a third collection angle able to capture at least one third image representing particles lying in a third range of sizes, and in that the processing unit is in communication connection with the third imager, the processing unit being able to process the images captured by the first, second and third images in order to determine the water content present in the atmosphere.

8. The device according to claim 1, in which the laser beam has a sheet form that lies in an emission plane, and in which the mean dimension of the laser beam in a direction perpendicular to the emission plane is defined in accordance with the following equation $$t(di)=2\times\ln((di+150)/150)$$

in which:
t is the dimension of the laser beam measured in a direction perpendicular to the emission plane, and
di is the size of the particles measured in the plane perpendicular to the diffusion axis.

9. A device for detecting icing atmospheric conditions, which comprises:
a device for determining the water content defined according to claim 1:
an input able to receive a temperature value of the outside air,
and in which the processing unit is able to detect icing conditions according to the water content determined and the value of the temperature of the outside air.

10. A method for determining the water content in the atmosphere by the processing of images acquired by a device comprising a laser emitter able to emit a laser beam intended to illuminate water and ice particles present in the atmosphere, a first and second imager able to capture at least one first image and respectively a second image representing particles, and a processing unit in communication connection with the first and second imager, the method comprising the following steps:
determining the sizes of the particles imaged on said first image and said second image;
calculating the mass of the particles per unit volume of the imaged particles on said first image and said second image; and determining the water content in the atmosphere by adding the mass calculated for the first image and the mass calculated for the second image.

11. A method for detecting icing atmospheric conditions comprising the following steps:
   determining the water content by implementing the determination method described above with reference to claim 10;
   receiving an outside temperature value;
   detecting icing atmospheric conditions from the water content and the outside temperature value.

12. A non-transitory computer program containing instructions for implementing the determination method according to claim 10, when it is executed by a processor.

13. A non-transitory computer program containing instructions for implementing the detection method according to claim 11, when it is executed by a processor.

14. The device according to claim 1 wherein the laser beam has a sheet form that lies in an emission plane, and in which the first and the second imagers have each an optical axis that forms a diffusion angle with the emission plane of the laser sheet, and in which the diffusion angles are equal to 90° and 120°.

15. The method according to claim 10, wherein the second image contains interferograms representing particles, and wherein the method further comprises the steps of:
   separating the interferograms from the background of the first image and of the second image;
   searching the interferograms representing the water particles and interferograms representing ice particles; the sizes of the particles being determined by the calculation of the Fourier transform of the interferograms; and
   determining the sizes of the ice particles imaged on said first image and said second image by carrying out a two-dimensional autocorrelation function of the speckle pattern of the interferograms, the mass of the particles being calculated from the sizes determined.

* * * * *